Feb. 28, 1933.　　　R. N. EARLY　　　1,899,859
DYNAMO ELECTRIC MACHINE
Filed Nov. 22, 1930　　5 Sheets-Sheet 1

INVENTOR
Robert N. Early
BY
Pennie, Davis, Marvin & Edmonds
HIS ATTORNEYS

Feb. 28, 1933.   R. N. EARLY   1,899,859
DYNAMO ELECTRIC MACHINE
Filed Nov. 22, 1930   5 Sheets-Sheet 2

INVENTOR
Robert N. Early
BY
Pennie, Davis, Marvin & Edmonds
HIS ATTORNEYS

Feb. 28, 1933.   R. N. EARLY   1,899,859
DYNAMO ELECTRIC MACHINE
Filed Nov. 22, 1930   5 Sheets-Sheet 5

INVENTOR
Rupert N. Early
BY
Pennie, Davis, Marvin & Edmonds
HIS ATTORNEYS

Patented Feb. 28, 1933

1,899,859

UNITED STATES PATENT OFFICE

RUPERT NUCKOLLS EARLY, OF MINNEAPOLIS, MINNESOTA, ASSIGNOR TO ELECTRIC MACHINERY MANUFACTURING COMPANY, OF MINNEAPOLIS, MINNESOTA, A CORPORATION OF MINNESOTA

DYNAMO ELECTRIC MACHINE

Application filed November 22, 1930. Serial No. 497,543.

This invention relates to electric motors, and more particularly concerns improvements in synchronous and induction motors and in means for starting motors of this type.

In the starting of alternating current motors of the synchronous or induction type, it is usually necessary or desirable to provide some means external to the motor for cutting down the voltage applied to the primary motor winding during the starting period. Thus, it has been customary to provide some means, such as an ordinary auto-transformer, for reducing the voltage applied to the motor terminals at least until the motor has accelerated to a considerable speed, and this for the reason that unless some such means is employed, the current drawn by the motor is excessive and may cause injury to the motor and an undesirable surge on the power line.

The present invention contemplates the provision of an improved motor embodying a primary winding organization such that the impedance of the active primary circuit may be materially increased during the starting period, thereby limiting the flow of current in the motor primary to a safe value at all times. More specifically, it is proposed in accordance with the present invention to provide a motor having two or more primary winding sections so disposed and concentrated that the impedance of the primary circuit may be very materially increased when one of the primary winding sections is disconnected from the line.

The increase in the impedance of the primary winding which results when one section thereof is disconnected from the line, is in part due to the higher resistance of the remaining section but is more largely due to the increased reactance of the circuit when a portion thereof is disconnected. The resultant reactance of the primary circuit is always increased when a parallel section thereof is disconnected from the line, but since all sections of the primary winding have a common magnetic core, the amount of increase in reactance and consequent decrease in primary current caused by disconnecting one or more sections depends upon the distribution of the windings on the primary magnetic structure.

The reactance of a uniformly distributed primary winding is less than that of a concentrated winding, and, accordingly, by concentrating the coils of the primary winding, it is possible to increase the reactance and thereby limit the flow of current. My invention covers this method of increasing the effective reactance as well as other methods of accomplishing this result.

In general, the objects of the invention are carried out by providing a motor having a primary winding comprising two or more winding sections, at least one of which is concentrated to provide high reactance, and by providing means for temporarily increasing the impedance of the other section, such as means for temporarily disconnecting such section from the line, during at least a portion of the starting period.

In accordance with the present invention, the separate sections of the primary winding may be concentrated at different poles of the primary winding whereby each winding section has a reactance which is high as compared to the reactance of the several sections when connected in parallel. Thus, according to one embodiment of my invention, the winding sections employed are concentrated at alternate poles of the primary winding so that, if two primary winding sections are used, one section includes coils disposed at every second pole and the other section includes coils disposed at the intervening poles of the primary winding. In another embodiment, the separate primary winding sections are respectively disposed to take in the coils of alternate groups of at least two adjacent poles of the primary winding. In each of the embodiments referred to, suitable means are provided for temporarily increasing the impedance of at least one of the separate winding sections during at least a part of the starting period, and such means preferably comprises apparatus for temporarily disconnecting one or more of the winding sections from the line. The invention may be utilized by employing manually operable devices for temporarily changing the connections of the primary winding sections, but I prefer to provide automatic means for accomplishing this result, such as means responsive to the electrical condition of a secondary winding, or to the slip or speed of the motor.

The various objects and advantages of the invention will be best understood from a consideration of the following detailed description and the accompanying drawings, in which.

Figure 1:
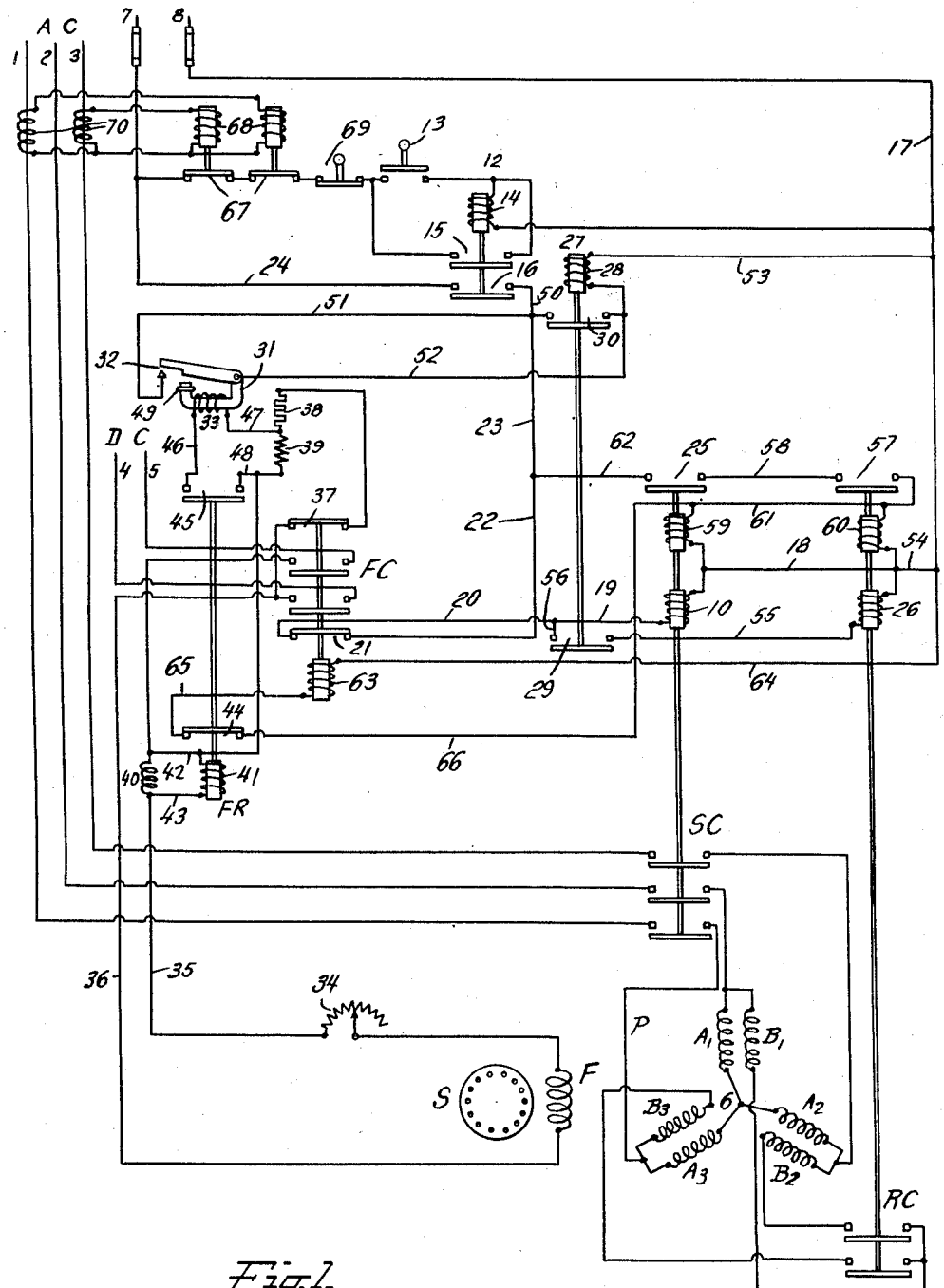
Figure 1 is a diagrammatic representation of an electric motor and starting system embodying the invention.

In Fig. 1 I have illustrated a synchronous motor having a three-phase star-connected primary winding generally designated at P, a field winding F and a squirrel cage or damper winding S. The leads 1, 2, and 3 represent a source of three-phase alternating current and a source of direct current is represented by the leads 4 and 5 which may be connected to the field winding F.

The primary winding P comprises two three-phase winding sections A and B, the several phases of which are respectively designated $A_1$, $A_2$, $A_3$ and $B_1$, $B_2$, $B_3$. The winding section A has a neutral point 6. The outer terminals of the phases $B_1$, $B_2$ and $B_3$ comprising the winding section B are connected to the corresponding outer terminals of the phases $A_1$, $A_2$ and $A_3$ of the winding section A, and the inner terminals of the phases $B_1$, $B_2$ and $B_3$ may be connected to form a neutral point by closing the running contactor RC. The preferred arrangement of the primary winding sections relative to the primary magnetic structure of the motor will be hereinafter explained in detail.

The alternating current source 1, 2 and 3 may be connected to the outer terminals of the primary winding P by the starting contactor SC. It will be understood that the closing of the contactor SC connects the winding section A to the alternating current source and that the closing of the contactor RC serves to connect the winding section B to this same source. Furthermore, it will be clear that when both of the contactors SC and RC are closed, the two winding sections A and B are connected in parallel across the alternating current source.

In starting the motor of Fig. 1, the contactor SC is first closed to supply current to the winding section A and after the motor has attained a suitable speed, the contactor RC is closed to connect the other winding section B across the line. It will be noted that the winding section B is connected to the line without in any way interrupting the connection of the winding section A to the line. Accordingly, there is no interruption in the flow of current to the primary winding and no surge occurs on the line because of the interruption of the current, as is the case when a transfer from reduced voltage to full voltage is made in the heretofore customary manner involving the use of an autotransformer.

I have shown the contactor SC as being operated by a closing coil 10 which may be supplied with current from any suitable control circuit such as that represented by the wires 7 and 8. A pilot relay 12 and a starting push button 13 are included in the control circuit and it will be understood that upon closing the push button 13 the operating coil 14 of the pilot relay 12 is energized and the contacts 15 and 16 of this relay are closed. The closing of the contacts 15 completes a holding circuit for the coil 14 around the push button 13 and the closing of the contacts 16 serves to connect the operating coil 10 of the contactor SC across the supply leads 7 and 8, this circuit being as follows; from wire 8 to wires 17, 54 and 18, operating coil 10 of contactor SC, wires 19 and 20, contacts 21 of the field contactor FC, wires 22, 23 and 50, contacts 16 of the pilot relay 12 and wire 24 to wire 7. The closing of the contactor SC closes its auxiliary contacts 25.

As explained above, the closing of the contactor SC serves to supply current to the winding section A and the rotor of the motor commences to revolve. After the motor has attained say 80% of its normal operating speed (the particular value depending upon operating conditions) the running contactor RC may be closed to connect the remaining winding section B to the line.

The closing of the contactor RC may be accomplished by means of a closing coil 26 which may be supplied with current from the control circuit 7, 8. A control relay 27 may be employed for controlling the energization of the operating coil 26. The relay 27 has an operating coil 28 and contacts 29 and 30. Means are provided for delaying the operation of the control relay 27 and hence the closing of the contactor RC until the motor is in proper condition to have its inactive primary winding section connected across the line. I have represented such a means in the form of a relay 31 having contacts 32 and an operating coil 33 which may be connected in circuit with the secondary winding F of the motor. The winding F is connected to a field rheostat 34 and a field contactor FC by means of the wires 35 and 36. The field contactor FC is open during the starting period and auxiliary contacts 37 of this contactor serve to connect the field winding F in a closed circuit through the resistance elements 38 and 39 during the starting period. A reactance 40 is also connected in the field circuit and the operating coil 41 of a frequency relay FR is connected across the reactance 40 by means of wires 42 and 43. This frequency relay has normally closed contacts 44 and normally open contacts 45. The operating coil 33 of the relay 31 is connected across the resistance element 39 through the contacts 45 of the frequency relay by means of the wires 46, 47 and 48.

When voltage is first applied to the motor, an induced current of slip frequency is induced in the field circuit and a relatively large portion of this current flows through the coil 41 of the frequency relay FR due to the fact that this coil is connected across the reactance 40 which is in series with the field winding F. The frequency relay FR immediately operates to open its contacts 44 and close its contacts 45. The closing of the contacts 45 connects the relay coil 33 in parallel with the resistor 39. This resistor 39 has a relatively high resistance and, accordingly, a large part of the induced field current flows through the relay coil 33. When the motor speed reaches a value such that it is appropriate to connect the winding section B of the primary winding P across the line, the frequency of the induced field current has reached such a low value that the relay 31 closes its contacts 32. A damper ring 49 on the core of this relay prevents the closing of the contacts 32 until the frequency of the current flowing through the relay coil 33 is reduced to a predetermined value corresponding with a motor speed such that the winding section B may be connected to the line without producing any undesirable line surge.

The operation of the relay 31 resulting in the closing of the contacts 32 thereof serves to supply current to the operating coil 28 of the control relay 27, the circuit including the wires 50 and 51 connecting the pilot relay contacts 16 and the contacts 32 of the relay 31, and the wires 52 and 53 connecting the control relay coil 28 with the contacts 32 of the relay 31 and the wires 17 and 8. When the control relay 27 operates, its contacts 29 and 30 are closed. The closing of the contacts 30 completes a holding circuit for the operating coil 28 around the contacts 32 of the relay 31 and the closing of the contacts 29 serves to connect the operating coil 26 of the running contactor RC to the control circuit. The circuit for energizing the operating coil 26 may be traced as follows: from the wire 8, wires 17 and 54, operating coil 26, wire 55, contacts 29 of the control relay 27, wire 56, wire 20, auxiliary contacts 21 of the field contactor FC, wires 22, 23 and 50, contacts 16 of the pilot relay 12 and wire 24 to wire 7. It will be noted that energy is supplied to the operating coil 26 of the running contactor RC through the closed contacts 16 of the pilot relay 12, and, accordingly, the contactor RC cannot be closed until the pilot relay is energized and current consequently supplied to the operating coil 10 of the starting contactor SC.

The closing of the running contactor RC causes the auxiliary contacts 57 associated therewith to close, and it will be noted that these contacts are connected in series with the auxiliary contacts 25 of the starting contactor SC by means of the wire 58. Thus, when both auxiliary contacts 25 and 57 are closed, current is supplied to the holding coils 59 and 60, the circuit being from the wire 8 through wires 17, 54 and 18, the holding coils 59 and 60, wire 61, contact 57, wire 58, contact 25, and wires 62, 23, and 50, contact 16 of pilot relay 12 and wire 24 to wire 7.

When the motor reaches a speed near synchronous speed, the coil 41 of the frequency relay FR becomes deenergized whereupon the contacts 44 close and contacts 45 open. The closing of contacts 44 serves to supply current from the control circuit to the operating coil 63 of the field contactor FC. The circuit for this operating coil 63 is as follows: from wire 8, wires 17 and 64, operating coil 63, wire 65, contacts 44 of frequency relay FR, wires 66 and 61, auxiliary switch contacts 57, wire 58, auxiliary switch contacts 25, wires 62, 23 and 50, contacts 16 of the pilot relay 12 and wire 24 to wire 7.

The closing of the field contactor FC serves to supply excitation current to the field winding F from the source of direct current represented by the wires 4 and 5. The closing of the field contactor also serves to open the contacts 21 and 37 thereof. The opening of the contacts 37 disconnects the discharge resistance 38—39 from the field winding F, and the opening of the contacts 21 interrupts the flow of current from the wires 7 and 8 to the operating coils 10 and 26 of the contactors SC and RC, and it will be understood that thereafter these contactors are respectively held in their closed positions by the holding coils 59 and 60.

As pointed out above, the holding coils 59 and 60 are energized through the contacts 16 of the pilot relay 12. The operating coil 14 of this relay derives its current from the wires 7 and 8 through the contacts 67 of the overload relays 68 and the contacts of a push button switch 69. By opening the switch 69, the pilot relay 12 is deenergized and in turn, the holding coils 59 and 60 are deenergized to open the starting and running contactors SC and RC. Also, the operating coil 63 of the field contactor FC is deenergized and this contactor opens to disconnect the field winding F from the source of direct current 4—5. In a like manner, the motor is disconnected from the line and from the source of direct current whenever the overload relays 68 operate to open its contacts 67. The overload relays 68 are connected to current transformers 70 in the usual manner.

It should be understood that the above described means for controlling the operation of the starting and running contactors SC and RC and so governing the successive energization of the primary winding sections in accordance with the electrical condition of the motor secondary winding may be dispensed with and that these contactors may be manually operated or may be operated by speed controlled means, time delay means or in any other suitable manner. Further, the invention is equally applicable to both synchronous and induction motors. It will be understood that when the invention is applied to induction motors, the secondary winding F may be disregarded and the starting and running contactors will be operated manually or by any other suitable means.

Figure 2:
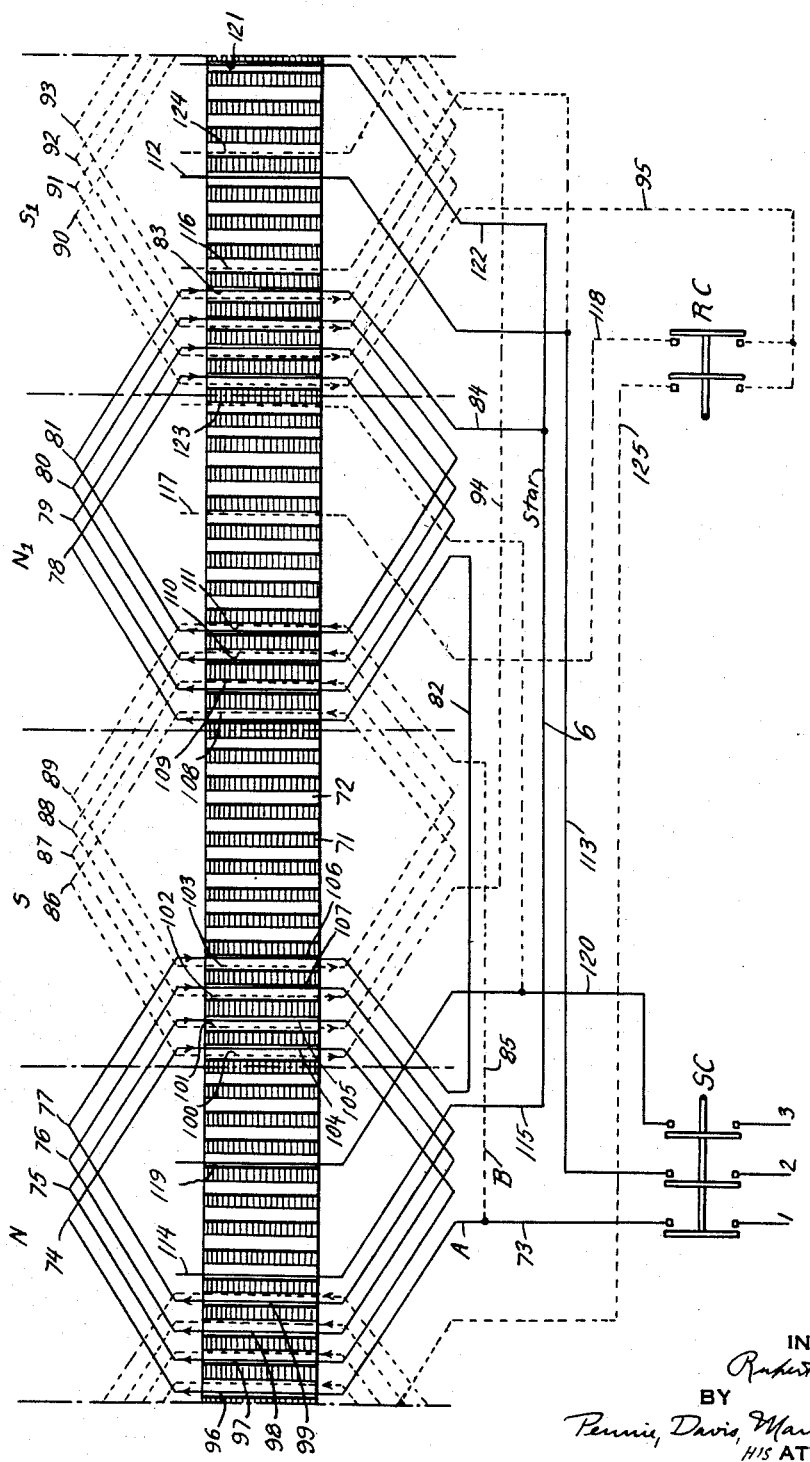
Fig. 2 is a plan view of a development of the primary magnetic structure of the motor of Fig. 1 showing one form of primary winding employed in accordance with the present invention.
Figure 3:
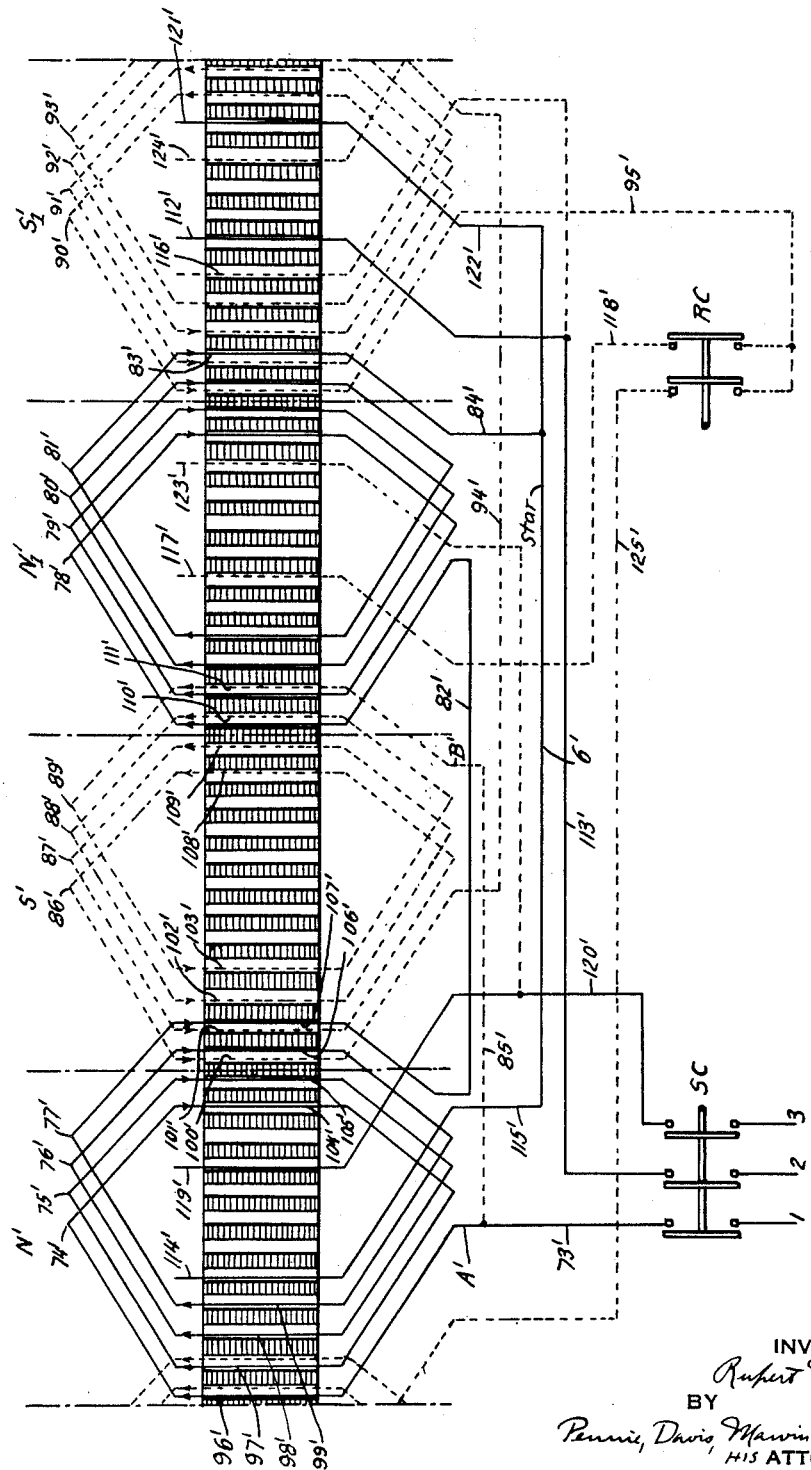
Fig. 3 is a view similar to Fig. 2 showing a fractional rather than a full pitch primary winding.

Referring now more particularly to the arrangement of the sectionalized primary winding of my improved motor, I prefer to arrange the primary coils in a manner so as to provide high reactance. Thus, for example, by concentrating the coils, a higher reactance can be obtained than by using a more uniformly distributed or more closely magnetically coupled arrangement of the coils. In Figs. 2 and 3, I have illustrated the separate winding sections as being so arranged that at least one of the corresponding coil sides of the respective sections are concentrated on alternate poles of the motor primary structure, and in Figs. 4 and 5, I have illustrated a winding in which the separate winding sections are concentrated to a greater extent, the corresponding coil sides of the respective winding sections being disposed on alternate groups of at least two adjacent poles.

The winding arrangements of Figs. 2, 3, 4 and 5 are shown on developments of the primary magnetic structures of similar motors and comprise plan views of the slotted inner surfaces of the primary cores. The teeth of the magnetic structures are indicated by the shaded portions 71 and the slots between the teeth by the intervening unshaded portions 72.

The motors illustrated are all of the four-pole three-phase type with four slots per pole per phase and two coil sides in each slot, two primary winding sections being used. It should be understood that the invention, in its broader aspects, embraces the use of the types of windings illustrated in Figs. 2, 3, 4 and 5 on motors having any desired number of poles, phases, slots per pole per phase and coil sides per slot, and that more than two primary winding sections may be used within the scope of the invention. In order to simplify the disclosure, the windings of one phase only has been shown in full, the end coil sides and connections of the other two phases being indicated. The coil sides may be disposed in the core slots 72 in any desired manner. When two or more coil sides are disposed in each slot, it is customary to place them one above the other in the slot, but in order to clarify the disclosure, the separate coil sides have been shown side-by-side in each slot. For convenience, it may be assumed that the coil sides disposed at the left side of each slot 72 are located at the top of the slots while the coil sides at the right of the slots are located at the bottom thereof. The primary winding section represented as A in Fig. 1 has been shown in full lines and the winding section B in broken lines, in Figs. 2, 3. 4 and 5. Although only one complete phase has been shown, the coil sides in each slot have been indicated by full and broken lines adjacent the slot ends.

Referring now more particularly to Fig. 2, it will be seen that the first phase of the winding section A starts at the terminal 73 which may be connected through the starting contactor SC to the phase wire 1. This first phase of the winding section A comprises the coils 74, 75, 76, 77, 78, 79, 80 and 81 which are connected in series in the order named through a circuit including the end connection 82. The end coil side 83 of the last coil 81 is connected to the star or neutral point represented by the wire 6 through the end connection 84. The corresponding phase of the other winding section B starts at the end connection 85 which is connected to the terminal 73, and includes the coils 89, 88, 87, 86, 93, 92, 91 and 90, which coils are connected in series in the order named through a circuit including the end connection 94. The first phase of the winding section B terminates through the end connection 95 at the neutral or star point formed by the contactor RC when closed.

It will be seen that the winding sections A and B are so disposed that at least one of the corresponding coil sides of the respective sections are respectively located at alternate poles of the machine, that is, the left hand coil sides of the coils in the winding section A are located under every second pole and the left hand coil sides of the coils in the winding section B are located under the intervening poles. Since full pitch windings are employed in the particular arrangement shown in Fig. 2, both of the corresponding coil sides of the coils in the separate winding sections are respectively located under alternate poles.

Thus, referring to the drawings, the left hand coil sides 96, 97, 98 and 99 of the respective coils 74, 75, 76 and 77 in the winding section A are all located under the north pole N whereas the left hand coil sides 100, 101, 102 and 103 of the respective coils 86, 87, 88 and 89 in the winding section B are all located under the adjacent south pole S. Also, the right hand coil sides 104, 105, 106 and 107 of the respective coils 74, 75, 76 and 77 in the winding section A are all located in slots under the south pole S whereas the right hand coil sides 108, 109, 110 and 111 of the respective coils 86, 87, 88 and 89 in the winding section B are all located under the adjacent north pole $N_1$. Although the remaining two phases have not been shown in full, it will be evident that this respective disposition of the corresponding coil sides of coils in the separate winding sections under alternate poles is carried out throughout the primary structure.

In order to indicate the manner in which the two remaining phases are arranged, the end coil sides and end connections of both winding sections of these phases have been shown. Thus, the first coil side of the second phase in the winding section A has been indicated at 112 and is connected by the terminal 113 to the starting contactor SC. The second phase of the winding section A terminates at the coil side 114 which is connected to the star or neutral point 6 by the end connection 115. The second phase of the winding section B starts at the coil side 116 connected to the terminal 113 and terminates at the coil side 117 connected by the end connection 118 to the star point contactor RC. The third phase of the winding section A starts at the coil side 119, connected to the contactor SC by the terminal 120 and terminates at the coil side 121, connected to the star point 6 by the end connection 122. The third phase of the winding section B starts at the coil side 123 connected to the terminal 120 and terminates at the coil side 124 connected to the star point contactor RC by the end connection 125. The location of the coil sides in the remaining slots has been indicated by the full lines (representing the winding section A) and the broken lines (representing the section B) adjacent the ends of the slots.

It should be understood that each of the primary winding coils shown in Fig. 2, as well as the corresponding coils shown in the remaining figures, may comprise any desired number of series connected turns of wire, and that these coils have been shown as comprising one turn of wire each for the sake of simplifying the drawings.

The location of the corresponding coil sides of the two primary winding sections at alternate poles gives a degree of magnetic coupling between the winding sections which is desirable in many installations. Thus, the percentage reduction in K V A inrush at starting produced by this winding arrangement has been found to average in the neighborhood of 27% on certain machines, it being understood that the percentage reduction in K V A will vary somewhat depending upon the numbers of poles, the pitch of the windings and various other factors.

In the embodiment of the invention shown in Fig. 2, full pitch primary windings are employed, but this alternate pole arrangement may also be used with fractional pitch windings. Thus, in Fig. 3, I have shown a winding embodying the alternate pole arrangement of the winding sections as applied to a motor with fractional pitch windings. The windings shown in Fig. 3 are shortcorded or reduced in width by an amount equal to two times the slot pitch, that is, the opposite coil sides of each of the winding coils shown in Fig. 3 are spaced apart a distance shorter by two slots than the distance between the opposite coil sides of the corresponding coil of the winding shown in Fig. 2. The effect of this degree of short-cording is equivalent to placing the coil sides of the coils in Fig. 3 $83\frac{1}{3}\%$ of the pole pitch distance apart rather than 100% or the full pole pitch distance apart, as in Fig. 2.

The fractional pitch winding of Fig. 3 may be considered as being derived from the full pitch winding of Fig. 2 by moving the right coil side of each coil two slots nearer the left coil side thereof, all of the left coil sides being maintained in the same slots as in Fig. 2. Since the fractional pitch winding arrangement of Fig. 3 differs only in this respect from the full pitch winding shown in Fig. 2, the circuits of the winding arrangement of Fig. 3 will be readily traceable by reference to the above description of the circuits of Fig. 2. The coils, coil sides, terminals, poles and winding sections of Fig. 3 have been designated by the same reference characters (with distinctive exponents) as those employed to designate the corresponding elements in Fig. 2.

As in the case of the windings shown in Fig. 2, at least one of the corresponding coil sides of the separate winding sections shown in Fig. 3 are respectively located at alternate poles of the primary structure. Thus, the first four slots beginning at the left under the north pole N' respectively carry the left hand coil sides 96', 97', 98' and 99' of the respective coils 74', 75', 76' and 77' in the winding section A', whereas, the first four slots beginning from the left under the adjacent south pole S' respectively carry the left hand coil sides 100', 101', 102' and 103' of the respective coils 86', 87', 88' and 89' in the winding section B'.

In regard to the right coil sides of the coils in the separate winding sections of the embodiment shown in Fig. 3, since the coils are of fractional pitch, certain of these coil sides lie under the same poles, but it should be noted that the right coil sides of the corresponding coils in the two winding sections are respectively located under alternate poles. Thus, the right coil sides 104' and 105' of the respective coils 74' and 75' in the winding section A' are located under the pole N' and the right coil sides 108' and 109' of the respective corresponding coils 86' and 87' in the winding section B' are located under the adjacent pole S'. Also, the right coil sides 106' and 107' of the respective coils 76' and 77' in the winding section A' are located under the pole S' and the right coil sides 110' and 111' of the respective corresponding coils 88' and 89' in the section B' are located under the adjacent north pole $N_1'$.

Although the winding arrangement of Fig. 3 has been shown as having coils which are two slots narrower than the corresponding coils of the full pitch winding shown in Fig. 2, it will be readily apparent that various other fractional pitch windings may be employed without departing from the essentials of this embodiment of the invention, that is, the disposition of corresponding coil sides of the winding sections under alternate poles of the primary structure. Thus, the coils may be narrower or wider than full pitch coils by any desired amount without altering the above description relative to the disposition of at least one of the corresponding coil sides of each section at alternate poles.

Figure 4:
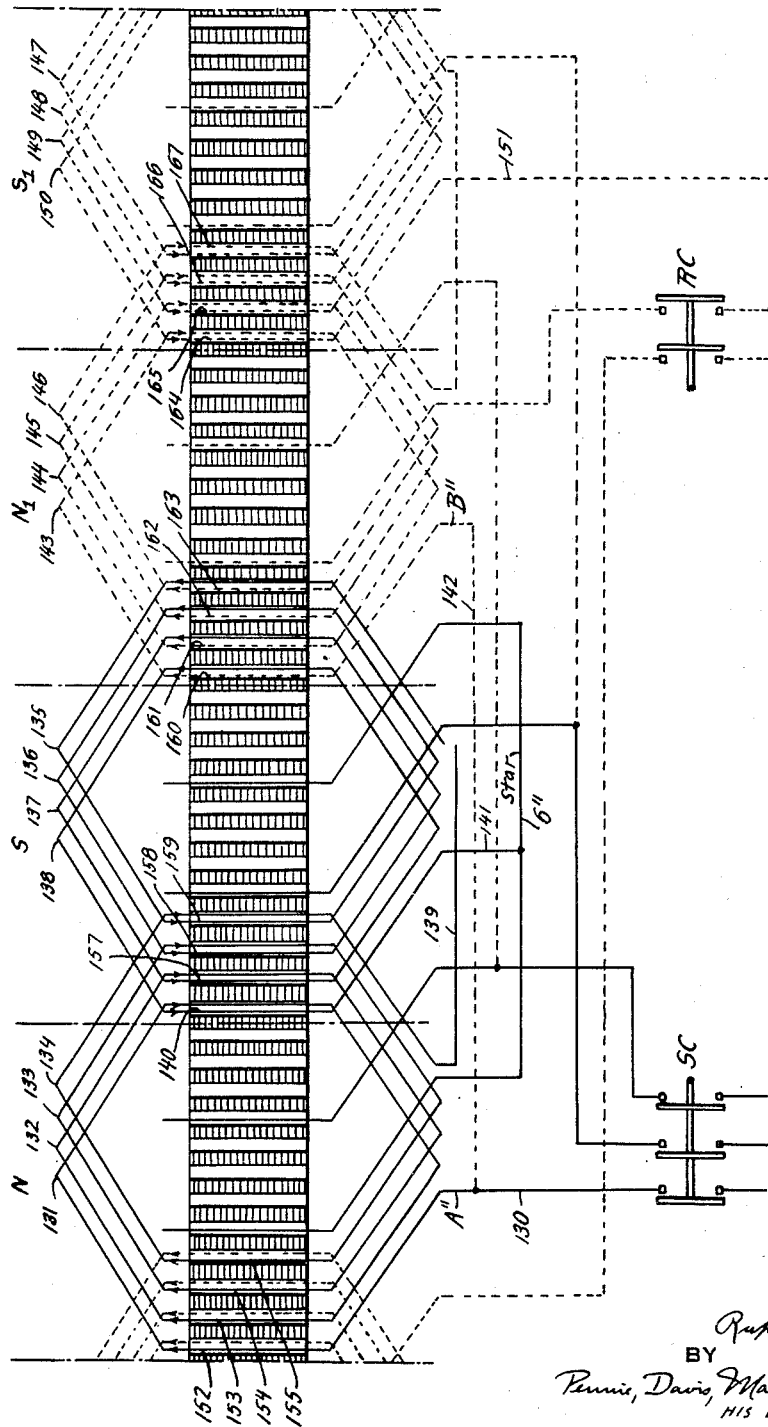
Fig. 4 is a plan view similar to Fig. 2 showing a modified form of full pitch primary winding employed in accordance with the present invention.
Figure 5:
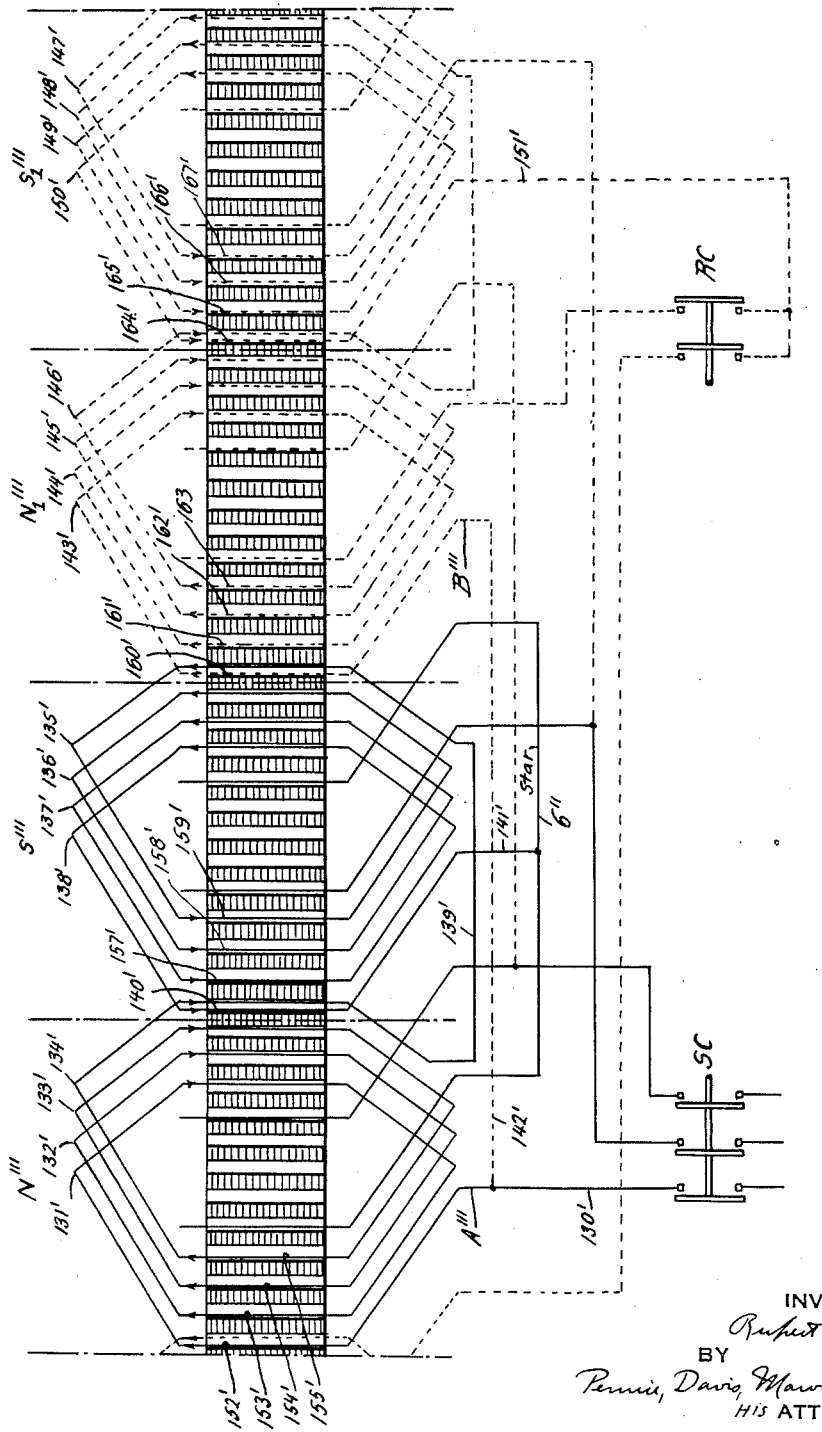
Fig. 5 is a plan view of a winding arranged in the manner shown in Fig. 4 but employing fractional pitch coils.

According to a further modification of the invention, as shown in Figs. 4 and 5, the separate winding sections are so arranged that at least one of the corresponding coil sides of the coils in the separate winding sections are respectively disposed under alternate groups of at least two adjacent poles of the primary structure. More specifically, the arrangement shown in these figures by way of illustrating this embodiment of the invention is such that at least one of the corresponding coil sides of the coils in the separate winding sections are respectively disposed under alternate groups of two adjacent poles. It should be understood that any desired number of adjacent poles other than two may be employed to carry the corresponding coil sides of the separate winding sections, and that the specific arrangement of groups of two adjacent poles is merely employed for the purpose of illustrating this embodiment of the invention. It will, of course, be obvious that groups of more than two adjacent poles can be employed only on machines having more than four poles.

Referring more in detail to Fig. 4, and considering the first phase of the winding section A'', this phase starts at the terminal 130 connected to the starting contactor SC and comprises the coils 131, 132, 133, 134, 135, 136, 137 and 138 which are connected in series in the order named through a circuit including the end connection 139. The end coil side 140 of the last coil 138 is connected to the star or neutral point 6'' by the end connection 141. The corresponding phase of the other winding section B'' starts at the end connection 142, connected to the terminal 130, and includes the winding coils 143, 144, 145, 146, 147, 148, 149 and 150, connected in series in the order named, and terminates through the end connection 151 at the neutral point formed by the contactor RC when closed.

It will be seen that the winding sections A'' and B'' are so disposed on the magnetic structure that each successive group of two adjacent poles respectively carries the corresponding coil sides of coils in the separate winding sections. Thus, beginning at the left of the developed primary magnetic structure shown, the first two adjacent poles N'' and S'' respectively include the left hand coil sides 152, 153, 154, and 155 of the coils 131, 132, 133 and 134 in the section A'' and the left hand coil sides 140, 157, 158 and 159 of the coils 138, 137, 136 and 135 also in the section A''. It will also be seen that the left hand coil sides 160, 161, 162 and 163 of the coils 143, 144, 145 and 146 in the winding section B'' and the left hand coil sides 164, 165, 166 and 167 of the coils 150, 149, 148 and 147 in the section B'' are respectively located under the second two adjacent poles $N_1''$ and $S_1''$. It will be clear from an inspection of the drawings that the right hand coil sides of the coils in the two separate winding sections are also respectively disposed under alternate groups of two adjacent poles. This relative disposition of the corresponding coil sides of the coils in the separate winding sections on alternate groups of two adjacent poles, is carried out throughout all phases of the winding in the same manner as that described above in connection with the first phase.

The embodiment of the invention shown in Fig. 4 employs full pitch windings, but this alternate groups of poles arrangement may be employed with fractional pitch windings, as well. Thus, in Fig. 5, I have shown a winding embodying the alternate groups of poles arrangement of the winding sections as applied to a motor having fractional pitch windings. The windings shown in Fig. 5 are short-corded or reduced in width by an amount equal to three times the slot pitch, that is, the opposite coil sides of each coil of the winding shown in Fig. 5 are spaced apart a distance shorter by three slots than the distance between the opposite coil sides of the corresponding coil of the winding shown in Fig. 4.

The fractional pitch winding of Fig. 5 may be considered as being derived from the full pitch winding of Fig. 4 by moving the right coil side of each coil three slots nearer the left coil side thereof, all of the left coil sides being maintained in the same slots as in Fig. 4. Since the fractional winding arrangement of Fig. 5 differs only in this respect from the full pitch winding of Fig. 4, the circuits of the winding arrangement of Fig. 5 will be readily traceable by reference to the description of the circuits of Fig. 4 given above. The coils, coil sides, terminals, poles and winding sections of Fig. 5 have been designated by the same reference characters (with distinctive exponents) as those employed to designate the corresponding elements in Fig. 4.

As in the case of Fig. 4, the corresponding coil sides of the separate winding sections shown in Fig. 5 are respectively located at alternate groups of two adjacent poles. Thus, starting at the left of the developed primary magnetic structure of Fig. 5, the first two adjacent poles $N'''$ and $S'''$ respectively carry the left hand coil sides 152', 153', 154', 155' and 140', 157', 158', 159' of coils in the winding section $A'''$, whereas the second two adjacent poles $N_1'''$ and $S_1'''$ respectively carry the left hand coil sides 160', 161', 162', 163', and 164', 165', 166', 167' of coils in the winding section $B'''$.

In regard to the right coil sides of the coils in the separate winding sections of the winding arrangement shown in Fig. 5, since the coils are of fractional pitch, certain of these coil sides lie under the same poles. Thus, for example, with the particular fractional pitch winding shown the right coil side of the coil 135' in the winding section $A'''$ lies under the same pole $N_1'''$ as do the right coil sides of the coils 143', 144' and 145' in the winding section $B'''$. However, it will be noted that the right coil sides of the corresponding coils in the two winding sections are respectively located at alternate groups of two adjacent poles. Thus, the right coil sides of the first three coils 131', 132', 133' and 138', 137', 136' in the winding section $A'''$ lie under the first two adjacent poles $N'''$ and $S'''$ and the right coil sides of the first three coils 143', 144', 145' and 150', 149', 148' in the winding section $B'''$ lies under the second two adjacent poles $N_1'''$ and $S_1'''$.

It should be understood that various fractional pitch windings other than the particular windings shown by way of illustration in Fig. 5 may be employed within the scope of the invention. Thus, the coils may be made narrower or wider than the full pitch coils by any desired amount without altering the above described respective disposition of the corresponding coil sides of the separate winding sections under alternate groups of at least two successive poles.

In the embodiment of the invention illustrated in Figs. 4 and 5, the separate winding sections are more concentrated, that is, less closely magnetically coupled, than are the winding sections in the embodiment of the invention illustrated in Figs. 2 and 3. Accordingly, when the embodiment of Figs. 4 and 5 is employed, the reduction in K V A inrush effected when one winding section only is connected to the line in starting the motor is appreciably greater than the corresponding reduction obtained with the alternate pole arrangement illustrated in Figs. 2 and 3. Thus, the reduction in KVA inrush at starting with the alternate groups of adjacent poles arrangement has been found to average in the neighborhood of 42 to 48% on machines comparable to those giving an average reduction of 27% when alternate pole windings are used.

It will be readily understood that the starting operation of the motors, the primary structures of which are shown in Figs. 2, 3, 4 and 5, corresponds to that disclosed above in connection with Fig. 1. Thus, in each case, the starting contactor SC is first closed by suitable means which are preferably manually governed thus connecting the first winding section A to the line. After the motor speed has reached a value such that it is appropriate to connect the second winding section B to the line, the contactor RC is closed by suitable means to effect this connection.

As explained above, the direct current exciting winding F is connected in closed circuit across the resistance 38 during at least the major portion of the starting period. Accordingly, during the starting period a current of slip frequency is induced in the field winding and at least a portion of the exciting winding may be regarded as adding to the inductive reactance component to form a high impedance winding whereby the squirrel cage winding S located on the secondary member produces a relatively high torque at a high power factor. This effect is greatest with the two primary winding circuits disposed on alternate groups of poles. Under this condition, with the field winding connected in closed circuit and with only one primary circuit connected to the line, current is induced in half of the field coils while the other half produces the effect of a high reactance, thus limiting the flow of current in the field circuit and providing a relatively high ratio of torque per KVA.

It is to be understood that the invention is not limited to the specific embodiments illustrated and described but includes such modifications thereof as fall within the scope of the appended claims. For example, while I have shown primary windings consisting of two winding sections, it is to be understood that two or more winding sections may be employed. Further, the motors on which the winding arrangements of the invention are used may be of various types other than the four-pole three-phase motors shown.

I claim:

1. The combination of an electric motor comprising a polyphase primary winding comprising a plurality of winding sections forming at least two similar polyphase circuits with the impedance of one circuit alone greater than both circuits in parallel, said sections respectively comprising coils having at least one of their corresponding coil sides disposed at separate poles of the primary winding, and starting means for the motor comprising means for connecting one of said circuits to a source of polyphase current and switching means for connecting the other circuit in parallel with said first circuit whereby the motor may be started on one circuit with relatively low starting current by initially connecting said first circuit alone to a source of current and thereafter connecting the second circuit in parallel with said first circuit whereby both circuits become energized by said source of current.

2. The combination of an electric motor comprising a polyphase primary winding comprising a plurality of winding sections forming at least two similar polyphase circuits loosely coupled inductively whereby the impedance of one circuit alone is greater than that of both circuits in parallel, and starting means for the motor comprising means for connecting one of said circuits to a source of polyphase current and switching means for connecting the other circuit in parallel with said first circuit whereby the motor may be started on one circuit with relatively low starting current by initially connecting said first circuit alone to a source of current and thereafter connecting the second circuit in parallel with said first circuit whereby both circuits become energized by said source of current.

3. The combination of an electric motor comprising a polyphase primary winding comprising a plurality of winding sections forming at least two similar polyphase circuits with the impedance of one circuit alone greater than that of both circuits in parallel, said sections respectively comprising coils having at least one of their corresponding coil sides located respectively at alternate poles of said winding, and starting means for the motor comprising means for connecting one of said circuits to a source of polyphase current and switching means for connecting the other circuit in parallel with said first circuit whereby the motor may be started on one circuit with relatively low starting current by initially connecting said first circuit alone to a source of current and thereafter connecting the second circuit in parallel with said first circuit whereby both circuits become energized by said source of current.

4. The combination of an electric motor comprising a polyphase primary winding comprising a plurality of winding sections forming at least two similar polyphase circuits with the impedance of one circuit alone greater than that of both circuits in parallel, said winding sections respectively comprising coils having at least one of their corresponding coil sides located respectively at alternate groups of at least two adjacent poles, and starting means for the motor comprising means for connecting one of said circuits to a source of polyphase current and switching means for connecting the other circuit in parallel with said first circuit whereby the motor may be started on one circuit with relatively low starting current by initially connecting said first circuit alone to a source of current and thereafter connecting the second circuit in parallel with said first circuit whereby both circuits become energized by said source of current.

5. The combination of a synchronous motor comprising a polyphase primary winding comprising a plurality of winding sections forming at least two similar polyphase circuits with the impedance of one circuit alone greater than that of both circuits in parallel, the said winding sections respectively comprising coils having at least one of their corresponding coils sides located respectively at alternate groups of at least two adjacent poles, a secondary member comprising a squirrel cage winding and a direct current exciting winding, and starting means for the motor comprising means for connecting said exciting winding in closed circuit, means for connecting one of said primary circuits to a source of polyphase current, and switching means for connecting the other primary circuit in parallel with said first primary circuit whereby the motor may be started on one primary circuit with relatively low starting current by initially connecting said first circuit alone to a source of current and thereafter connecting the second circuit in parallel with said first circuit whereby both circuits become energized by said source of current.

In testimony whereof I affix my signature.

RUPERT NUCKOLLS EARLY.